United States Patent
Balaneshinkordan et al.

(10) Patent No.: US 12,518,309 B2
(45) Date of Patent: Jan. 6, 2026

(54) SYSTEMS AND METHODS FOR REDUCING PERSONALIZED REAL ESTATE COLLECTION SUGGESTION DELAYS VIA BATCH GENERATION

(71) Applicant: MFTB Holdco, Inc., Seattle, WA (US)

(72) Inventors: Saeid Balaneshinkordan, Seattle, WA (US); Ondrej Linda, Seattle, WA (US); Kelsey Juraschka, Seattle, WA (US); Kai Liu, Seattle, WA (US); Mengnan Zhao, Seattle, WA (US); Kevin Liao, Seattle, WA (US); Siddhi Vakil, Seattle, WA (US); Joshua Gnanayutham, Seattle, WA (US)

(73) Assignee: MFTB Holdco, Inc., Seattle, WA (US)

( * ) Notice: Subject to any disclaimer, the term of this patent is extended or adjusted under 35 U.S.C. 154(b) by 272 days.

(21) Appl. No.: 17/859,872

(22) Filed: Jul. 7, 2022

(65) Prior Publication Data
US 2024/0013274 A1    Jan. 11, 2024

(51) Int. Cl.
*G06Q 30/0601* (2023.01)
*G06Q 50/16* (2024.01)

(52) U.S. Cl.
CPC ......... *G06Q 30/0629* (2013.01); *G06Q 50/16* (2013.01)

(58) Field of Classification Search
CPC ..... G06Q 30/00; G06Q 50/16; G06Q 30/0629
See application file for complete search history.

(56) References Cited

U.S. PATENT DOCUMENTS

| | | | |
|---|---|---|---|
| 2018/0121533 A1* | 5/2018 | Magnani | G06N 3/045 |
| 2019/0108217 A1* | 4/2019 | Chen | G06F 40/289 |
| 2020/0073953 A1* | 3/2020 | Kulkarni | G06N 3/084 |
| 2020/0251100 A1* | 8/2020 | Tan | G06N 3/08 |
| 2022/0084079 A1* | 3/2022 | Stewart | G06N 5/04 |

OTHER PUBLICATIONS

Bassani, Elias, "A multi-representaion re-ranking model for personalized product search", Sciencedirect.com,, dated Circa 2022 (Year: 2022).*
Real Time Processing Technologies in Big Data: Comparative Study (Year: 2017).*

* cited by examiner

*Primary Examiner* — Victoria E. Frunzi
(74) *Attorney, Agent, or Firm* — Merchant & Gould P.C.

(57) ABSTRACT

Systems and methods for reducing personalized real estate collection suggestion delays via batch generation are disclosed. The systems and methods use user interaction information, home attribute information, and one or more machine learning models to generate sets of suggested real estate listings corresponding to personalized real estate collections. The system generates a set of personalized collection identifiers in a batch process with a first set of suggested real estate listings corresponding to respective personalized collection identifiers. The system also generates a second set of suggested real estate listings corresponding to respective personalized collection identifiers of the set of personalized collection identifiers. To reduce delays associated with providing personalized real estate collections, the system selects the first set of suggested real estate listings based on the generation of the second set of suggested real estate listings to satisfy a threshold value.

18 Claims, 6 Drawing Sheets

SYSTEMS AND METHODS FOR REDUCING PERSONALIZED REAL ESTATE COLLECTION SUGGESTION DELAYS VIA BATCH GENERATION

BACKGROUND

Suggesting real estate listings to customers is not only a complex process but is also a cumbersome process. For example, a realtor may be given information about a customer (e.g., demographic, economic status, credit score, location preference, etc.) and must take this information to manually search through thousands of real estate listings to provide a real estate listing suggestion. This process may be repeated to provide the customer with a few real estate listing suggestions. Although numerous real-estate listing aggregators (e.g., websites, search engines, etc.) have appeared, realtors and customers alike may be inundated with a plethora of real estate listings after a filtering and may choose a real estate listing that is not the most suitable to the customer based on the customers wants and needs. These and other drawbacks exist.

Figure 1:
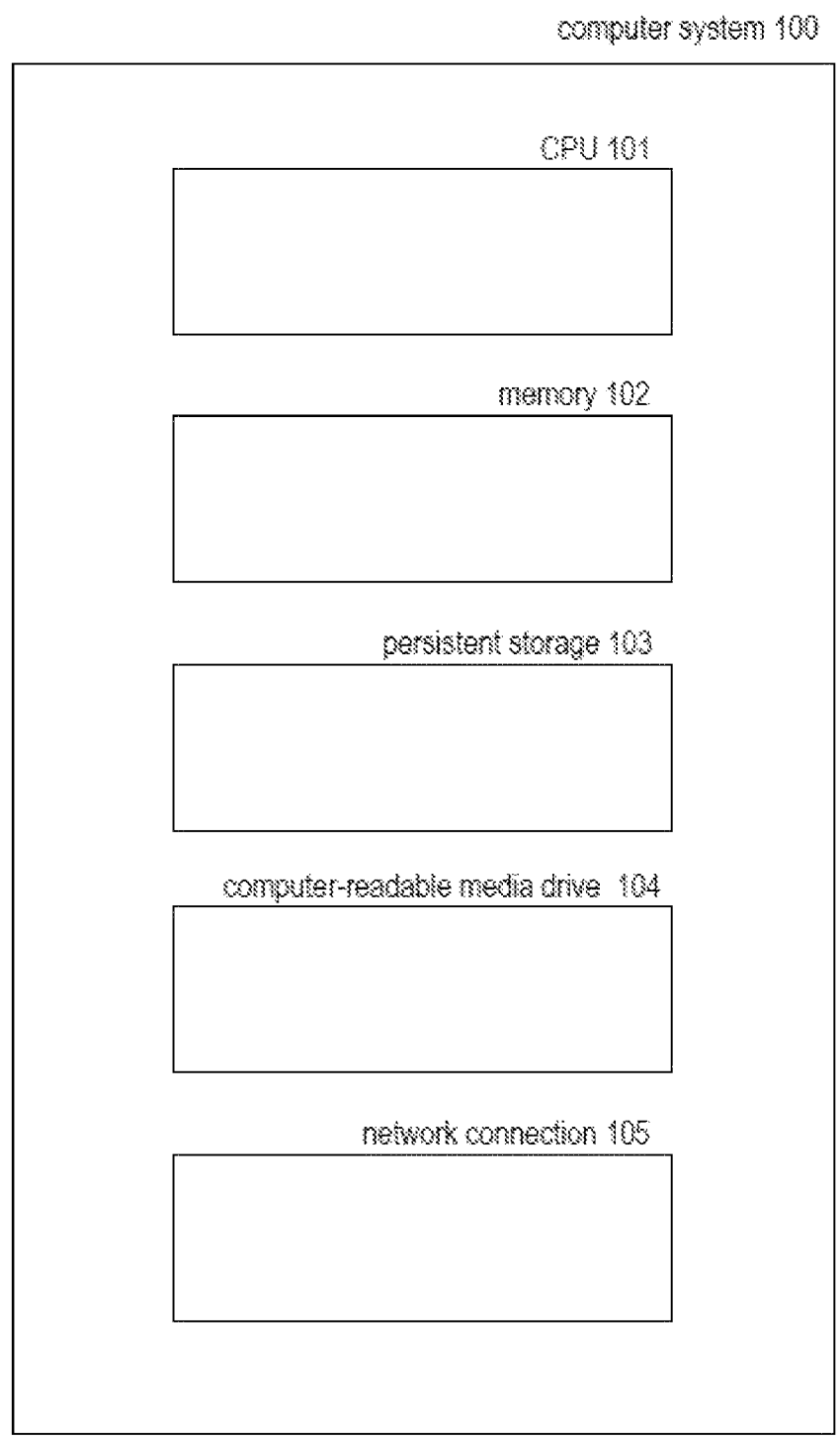
FIG. 1 is a block diagram showing some of the components typically incorporated in at least some of the computer systems and other devices on which the disclosed system operates in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Manually providing real estate suggestions is often based on limited information about a customer is a time consuming process and often provides customers with inadequate choices that may not satisfy/align with their interests. Although real estate databases exist where realtors or customers may search to find real estate listings that are of interest, these databases rely on users (e.g., realtors or customers) to directly search for real estate listings of interest based on home attributes. However, as users begin to search for real estate listings of interests, users may not be aware of each and every attribute that is within the real estate listing which may have an impact on their search/decision process. For example, inexperienced users may gain an interest in a particular style, location, or other feature of a home/real estate listing without exactly knowing what the correct name for the style, location, or other feature is. Additionally, because such users are often searching many different real estate listings, attributes (e.g. of a home) they are interested in may be forgotten over time.

Due to the amount of searching that is performed by a user to identify real estate listings of interest, there can be a large amount of time spent and computer resources required (e.g., such as memory, processing power, or other computer resources) to identify these real estate listings of interest. For example, conventionally, the user is required to query a database a multiplicity of times to identify real estate listings of interest. With each user submitted query, a server must process the query, query a real estate database, and return search results to the user, and display such returned search results. In some cases, the user may not be satisfied with the returned search results and submits another query, wasting such computer processing resources, memory, and energy, while slowing down the computer network used to provide the real estate listings of interest. Furthermore, even when a realtor provides suggested real estate listings to a customer, such suggestions may be inadequate as other real estate listings may exist that better fit the interests of the customer or it may take too long to provide such real estate listings causing a poor user experience. For instance, the realtor may only be able to rely on a small subset of information regarding a user's real estate interests and may provide such inadequate real estate suggestions. Alternatively, even when the realtor has a large amount of information regarding a user's real estate interests, the realtor may find difficulty parsing through such information and may take a long amount of time to provide the user (e.g., customer) with suggested real estate listings. Moreover, such real estate listing suggestions are not categorized based on real estate attributes where a user can easily compare the real estate listings within a given category to identify the most suitable real estate listing that fits the user's interests.

Additionally, conventional systems do not update real estate listing suggestions in a timely fashion based on the user's preferences, real estate listings the user has interacted with, home attributes associated with real estate listings the user has interacted with, or other user information. For example, such systems may rely on a one-time generation of suggested real estate listings based on acquired user information. However, such user information can change over time (e.g., hourly, daily, weekly, monthly) and these conventional systems are unable to provide real-time (or near real-time) real estate suggestions based on ever changing user information.

Thus, there is a need for systems and methods that can robustly suggest real estate listings to a user by determining features of interest to a user that the user may be unaware of. Additionally, there is a need for systems and methods that can decrease the amount of time and computer processing resources required to suggest real estate listings of interest to a user. Furthermore, there is a need for systems and methods that can provide categorized real estate listings to a user where each real estate listing in a given category is associated with similar attributes. Moreover, there is a need for systems and methods that can adapt to changing user information to provide the most up-to-date real estate listing suggestions.

To overcome these and other deficiencies, the inventors have developed an automated system for providing a set of ordered, personalized, real estate listing suggestions according to real estate collection identifiers that are specific to one or more of a user's real estate interests. The real estate collection identifiers can cover one or more aspects of a user's interest and each collection identifier may be associated with a set of suggested real estate listings that have one or more attributes according to the respective collection identifier. Additionally, each collection identifier and each real estate listing associated with each collection identifier can be ordered (e.g., based on a probability the user is interested in such collection identifier or real estate listings) to improve the user experience as users are able to easily find the most suitable real estate listing according to their interest.

Furthermore, as discussed above, although a realtor may generally know what a particular customer is looking for in a home, there are many other factors that are relevant to providing real estate listing suggestions that the realtor may not be aware of. For example, as a user (e.g., a customer) browses a real estate listing website that hosts a variety of real estate listings, the user can interact with one or more real estate listings (e.g., via clicking on a real estate listing, saving a real estate listing, submitting a real estate listing to a realtor, or other interaction). As the user interacts with these real estate listings, the personalized user collection system can save home attributes that are associated with each real estate listing to determine one or more user interests.

Additionally, to reduce the amount of computer resources required to provide a set of ordered personalized collections (e.g., where each collection is associated with a set of suggested real estate listings), the personalized user collection system uses a hybrid collection generation process. For example, as the user interacts with a variety of real estate listings over a given time period (e.g., a day, an hour, a minute, etc.), the personalized user collection system aggregates home attributes from real estate listings that the user has interacted with over such time period and determines collection identifiers to be provided to a user. Upon determining the collection identifiers to be provided to a user, the system can then generate a set of suggested real estate listings for each collection identifier to be provided to the user. However, determining such collection identifiers can be a computer processing resource intensive process. For instance, conventional systems parse through each and every real estate listing a user has interacted with, determine the most popular collection identifiers associated with the real estate listings the user has interacted with, and then identify real estate listings that share the collection identifier to provide the user with suggested real estate listings upon request. Such a complex and inefficient method uses a vast amount of computer processing resources as a user may request such suggested real estate listings many times throughout the day and takes a long time to generate such results.

To mitigate this drawback and provide the most up-to-date, categorized, real estate listing suggestions, the hybrid collection generation process can determine collection identifiers in a batch process over a given time period and generates suggested real estate listings corresponding to each collection identifier. For example, the hybrid collection generation process determines collection identifiers in a nightly batch process and generates a set of suggested real estate listings corresponding to each collection identifier. The hybrid collection generation process can also generate suggested real estate listings (e.g., corresponding to the collection identifiers) upon request. For instance, as the user's interests can change hourly, daily, weekly, nightly, or over another time metric, upon a user request, the hybrid collection generation process generates suggested real estate listings corresponding to the collection identifiers upon request (as opposed to the batch generated suggested real estate listings) to provide the user with the most up-to-date real estate listing suggestions. However, if the generation of suggested real estate listings upon request exceeds a threshold amount of time or does not return a threshold amount of results, to mitigate any poor user experiences, the hybrid collection generation process uses the batch generated suggested real estate listings. In this way, the system reduces the amount of computer processing resources required to provide personalized real estate listing suggestions to a user while improving the user experience by generating collection identifiers in a batch process and generating the real estate listings for each collection identifier upon a request or in a batch process based on a threshold amount of time or results.

In the following description, for the purposes of explanation, numerous specific details are set forth in order to provide a thorough understanding of implantations of the present technology. It will be apparent, however, to one skilled in the art that implementation of the present technology can practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Computing Environments

FIG. 1 is a block diagram showing some of the components typically incorporated in at least some of the computer systems and other devices on which the disclosed system operates. In various implementations, these computer systems and other devices 100 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: a central processing unit (CPU) 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; computer-readable media drives 104 (e.g., at least one non-transitory computer-readable medium) that are tangible storage means that do not include a transitory, propagating signal, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
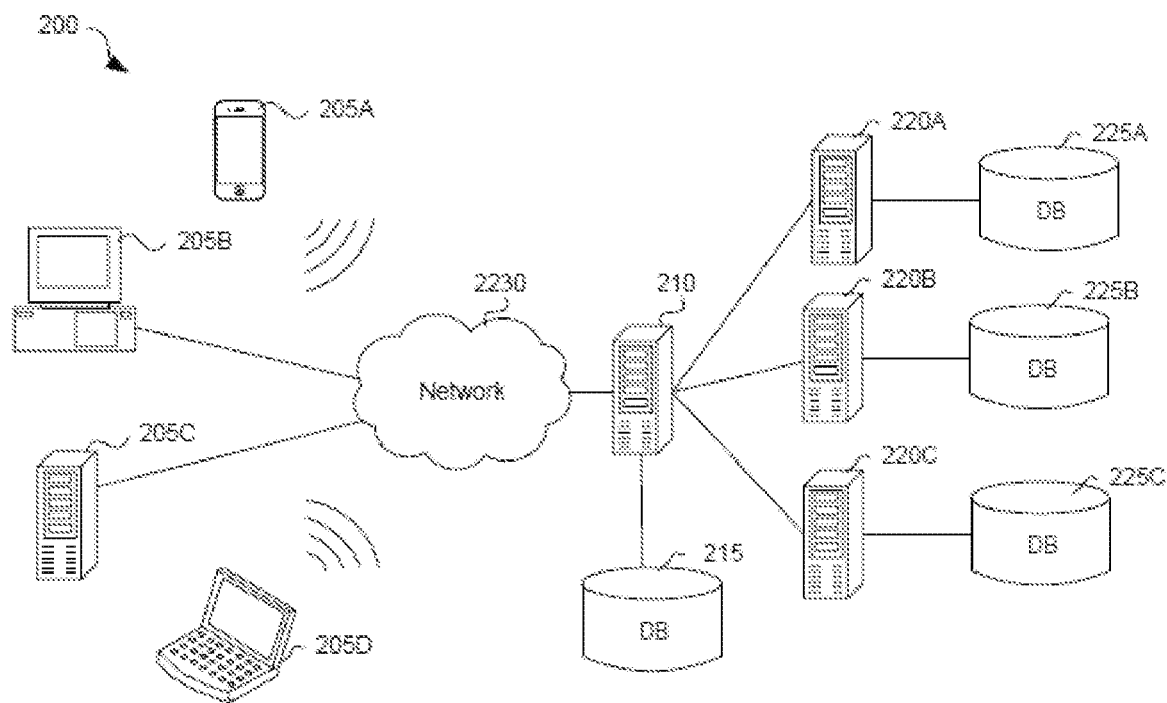
FIG. 2 is a system diagram illustrating an example of a computing environment in which the disclosed system operates in some implementations of the present technology.

FIG. 2 is a system diagram illustrating an example of a computing environment in which the disclosed system operates in some implementations. In some implementations, environment 200 includes one or more client computing devices 205A-D, examples of which can host the system 100. For example, the computing devices 205A-D can comprise distributed entities 1-4, respectively. Client computing devices 205 operate in a networked environment using logical connections through network 2230 to one or more remote computers, such as a server computing device.

In some implementations, server computing device 210 is an edge server which receives client requests and coordinates fulfillment of those requests through other servers, such as servers 220A-C. In some implementations, server computing devices 210 and 220 comprise computing systems, such as the system 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server or client devices. In some implementations, servers (210, 220A-C) connect to a corresponding database (215, 225A-C). As discussed above, each server 220 can correspond to a group of servers, and each of these servers can share a database or can have its own database. Databases 215 and 225 warehouse (e.g., store) information such as real estate listings, home information, recent sales, home attributes, particular homes, subject homes, comparable homes, home data, actual values of homes, predicted values of homes, automated valuation models, model data, training data, test data, validation data, confidence scores, predicted errors, one or more machine learning models, confidence models, confidence bins, partitions of homes, error distributions, conversion functions, confident home values, confident homes, updated confidence scores, updated predicted values of homes, calibrated confidence scores, calibration models, isotonic regression models, confidence selector models, most confident predicted values, ensemble models, synthetization/aggregation functions, not-easily-explainable or not-easily-interpretable models, explainable or interpretable models, confident valuation models, predefined ranges, predefined thresholds, error thresholds, graphical representations, requests for valuations, interquartile ranges of actual values, quantiles of actual values, upper quartiles of actual values, lower quartiles of actual values, bin threshold values, market or location, time or seasons, types of homes, model performance, confidence bin performance, sale prices, listing prices, and so on.

The one or more machine learning models can include supervised learning models, unsupervised learning models, semi-supervised learning models, and/or reinforcement learning models. Examples of machine learning models suitable for use with the present technology include, but are not limited to: regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), and ensemble algorithms (e.g., boosting, bootstrapped aggregation, AdaBoost, blending, stacking, gradient boosting machines, gradient boosted trees, random forest).

In various implementations, the one or more machine learning models can be trained on training data or a training set. The training data or training set can be created by generating pairs of features (e.g., feature vectors) and/or ground-truth labels/values based on any of the data stored in databases 215 and 225. During training, the machine learning models can be adjusted or modified to fit the models to the training data by, e.g., adjusting or modifying model parameters, such as weights and/or biases, so as to minimize some error measure (e.g., a difference between a predicted value and an actual/ground-truth value) over the training data. The error measure can be evaluated using one or more loss functions. Examples of loss functions that can be used include, but are not limited to, cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can then be applied to test data or validation data (e.g., holdout dataset) to generate predictions (e.g., predicted values or labels). The test data or validation data can also come from data that is stored in databases 215 and 225 (e.g., unlabeled data to generate predictions for). In some implementations, the machine learning models can be retrained to further modify/adjust model parameters and improve model performance. The machine learning models can be retrained on existing and/or new training data, training data, or validation data so as to fine-tune the model parameters to better fit the data and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 215 and 225 are displayed logically as single units, databases 215 and 225 can each be a distributed computing environment encompassing multiple computing devices, can be located within their corresponding server, or can be located at the same or at geographically disparate physical locations.

Network 2230 can be a local area network (LAN) or a wide area network (WAN), but can also be other wired or wireless networks. In some implementations, network 2230 is the Internet or some other public or private network. Client computing devices 205 are connected to network 2230 through a network interface, such as by wired or wireless communication. While the connections between server computing device 210 and server computing device 220 are shown as separate connections, these connections can be any kind of local, wide area, wired, or wireless network, including network 2230 or a separate public or private network.

Personalized Hybrid Collection Generation System

Figure 3:
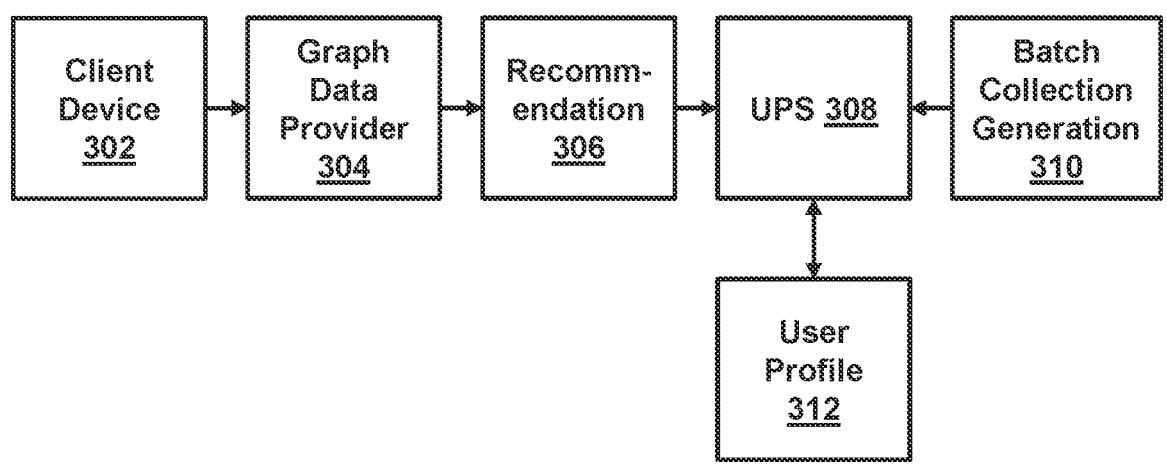
FIG. 3 is a block diagram illustrating components of system for generating personalized collection identifiers in accordance with some implementations of the present technology.

FIG. 3 is a block diagram illustrating components of a hybrid collection generation system 300 in accordance with some implementations of the present technology. The hybrid collection generation system 300 can include client device 302, graph data provider 304, recommendation module 306, User Profile Service (UPS) module 308, user profile module 312, and batch collection generation module 310.

Client device 302 can be the same or similar as client computing devices 205 in relation to FIG. 2. For instance, client device 302 can be a device that is configured for one or more users (e.g., customers, realtors, or other users) to interact with real estate listings via a real estate database. For example, the real estate database can include one or more real estate listings available to browse, view, or interact with. For example, the real estate database can be the same or similar to database 215, where the real estate database hosts a variety of real estate listings. Additionally, the real estate database also hosts user profile information (e.g., specific to one or more users).

As a user browses for real estate listings of interest via client device 302, real estate listings the user interacts with (and an interaction type) is stored in a remote data store. For example, a user can select a real estate listing (e.g., on a webpage or other user interface associated with the real estate database) and in response to the user's selection of the real estate listing, client device 302 can transmit the interaction of the user to the remote data store. The interactions indicate an interaction type such as a click, save, submit, or other interaction of the real estate listing. In some implementations, the user can be logged into a user account associated with the real estate database. For example, the real estate database can represent the backend of a computer system designed to allow users to interact with real estate listings. In addition to the real estate database hosting one or more real estate listings, the real estate database also hosts (e.g., stores) one or more user accounts/profiles. Upon any interaction the user has with a real estate listing, such interactions are stored in association with the user profile of the user for later retrieval. Furthermore, as each interaction is associated with a particular real estate listing, the type of interaction is further stored in association with the real estate listing. For example, where the user clicks on a real estate listing to view one or more real estate listing attributes, the click may be stored in association with the user's account with a real estate listing identifier (e.g., a URL of the real estate listing, a property name, a property location identifier, an address, a serial number, or other real estate listing identifier). In this way, the hybrid collection generation process obtains a set of real estate listings a user has interacted with to generate a suggested set of real estate listings a user is interested in.

Graph data provider 304 can be configured as a facilitator to obtain personalized collection identifiers and one or more sets of suggested real estate listings. For example, as a client device 302 can be configured for browsing real estate listings, the graph data provider receives queries, arguments, or filters to provide client device 302 with one or more personalized collection identifiers where each personalized collection identifier is associated with a set of real estate listings associated with a given personalized collection identifier. As an example, where client device 302 hosts a web browser configured to browse real estate listings, a user can submit a query for one or more real estate listings. Graph data provider 304 receives the query and interacts with recommendation module 306, UPS module 308, user profile module 312, or batch collection generation module 310 to provide one or more real estate listings to client device 302. For example, graph data provider 304 can transmit or receive one or more requests to/from recommendation module 306, UPS module 308, user profile module 312, or batch collection generation module 310.

Recommendation module 306 can be configured for obtaining one or more sets of suggested real estate listings. For example, recommendation module 306 interacts with one or more modules of system 300 to obtain one or more sets of suggested real estate recommendations that are associated with (or otherwise correspond to) one or more personalized collection identifiers. As an example, where batch collection generation module 310 generates a set of personalized collection identifiers, recommendation module 306 uses information associated with the set of personalized collection identifiers to generate one or more sets of suggested real estate listing that are associated with one or more of the personalized collection identifiers. In some implementations, recommendation module 306 is used to generate one or more sets of suggested real estate listings in real time (or near real time). For example, real time as used herein may indicate less than 0.0001, 0.001, 0.01, or 0.1 seconds with respect to the current time. For instance, where recommendation module 306 is used to generate one or more sets of suggested real estate listings in real time, such sets of suggested real estate listings are generated within 0.0001, 0.001, 0.01, or 0.1 seconds with respect to the current time, thus providing a user with the most-up-to-date suggested real estate listings for a given personalized collection identifier.

User Profile Service (UPS) module 308 can be configured to interact with batch collection generation module 310 and user profile module 312 to obtain (i) user specific information (e.g., from user profile information associated with users) and (ii) personalized collection identifier information (e.g., from collection identifiers generated via batch collection generation module 310). As an example UPS module 308 communicates with batch collection generation module 310 to provide batch collection generation module 310 with user specific information. In this way, batch collection generation module 310 accesses user specific information to generate personalized collection identifiers for a given user.

User profile module 312 can be configured to access, transmit, or receive, user specific information that is associated with a user profile of a user. For instance, user profile module can obtain a user profile for a user based on a user profile identifier (e.g., a name of the user, an alphanumeric string, an account number of the user, etc.). The user profile comprises user specific information about a user. For example, the user specific information can be based on the one or more user interactions with real estate listings. For instance, as described above, a user may interact with one or more real estate listings (e.g., via clicks, saves, submits, or other types of user interactions). Such user interactions are stored in association with a user profile of the user. For example, each user may have a user profile where user account information (e.g., name of a user, password of a user, payment information of a user, a set of interests of the user, demographic information of a user, other user account information, etc.), real estate listing interaction data (e.g., clicks of real estate listings, saves of real estate listings, submits of real estate listings, other real estate listing interaction data, timestamps of a user's interaction with a real estate listing, etc.), or other user profile information is stored. In some implementations, user profile module 312 is a database such as database 215 or database(s) 225 configured to store user profile information.

Batch collection generation module 310 can be configured for generating collection identifiers and real estate recommendations in a batch process. For example, batch collection generation module 310 generates personalized collection identifiers and real estate recommendations associated with the personalized collection identifiers over a predetermined time period based on user specific information. For example, the predetermined time period can be 1 hour, 2 hours, 24 hours, 48 hours, 72 hours, 1 month, 1 year, or other time period. To reduce the amount of computer processing resources required to provide a user with a set of personalized collection identifiers where each personalized collection identifier of a set of personalized collection identifiers is associated with a set of suggested real estate listings that correspond to a given personalized collection identifier, batch collection generation module 310 generates such personalized collection identifiers and sets of suggested real estate listings over the predetermined time period. For example, in a use case where the predetermined time period is a nightly update (e.g., updated every 24 hours), batch collection generation module 310 generates a set of personalized collection identifiers and a set of suggested real estate listings for a given personalized collection identifiers for a user in a nightly-update process. In this way, when a user requests a set of personalized suggested real estate listings, the system need not use extra computer processing resources to provide such recommendations to a user. That is, the set of personalized suggested real estate listings are pre-generated and are able to be retrieved by the system in a timely fashion as opposed to requiring the user to wait as the system generates the set of personalized suggested real estate listings upon request of the user.

Figure 4:
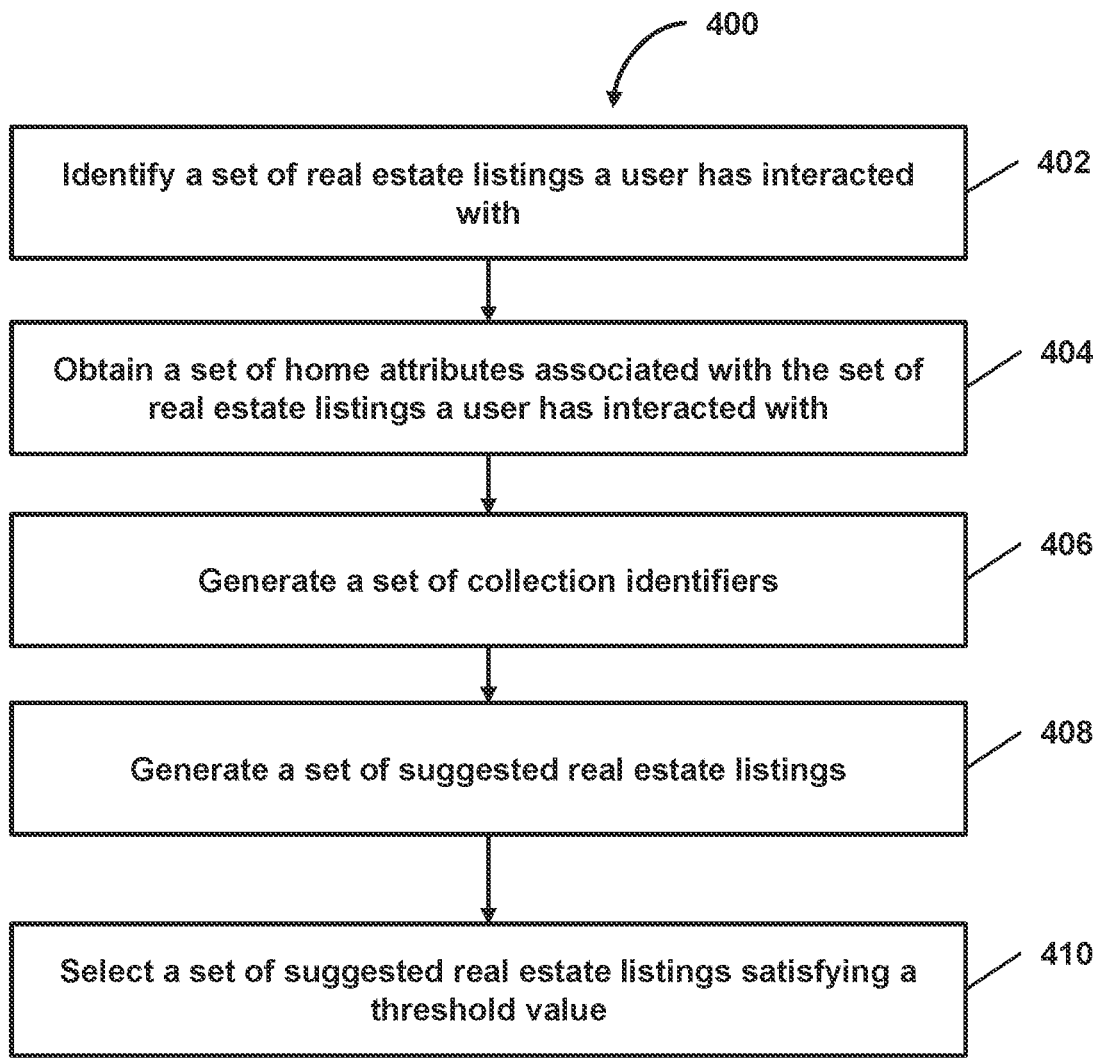
FIG. 4 is a flow diagram illustrating a process of providing personalized real estate listings according to real estate collection identifiers in accordance with some implementations of the present technology.

Providing Personalized Real Estate Listings According to Real Estate Collection Identifiers FIG. 4 is a flow diagram illustrating a process 400 of providing a set of ordered, personalized, real estate listings according to real estate collection identifiers that are specific to one or more of a user's real estate interests, in accordance with some implementations of the present technology. At act 402, process 400 performs identifying a set of real estate listings a user has interacted with. For example, to provide a user with one or more real estate collection identifiers where each real estate collection identifier is associated with a set of suggested real estate listings, process 400 can access a remote data store to obtain a user profile associated with a user. For instance, the remote data store can the same or similar as database 215 that is remote from a client computing device 205. Database 215 can be a real estate database hosting one or more real estate listings, user accounts (e.g., user profiles), one or more machine learning models, or one or more other models in accordance with one or more implementations.

Process 400 obtains, from a user profile associated with the user, a set of user interactions with real estate listings. The set of user interactions may be one or more clicks, saves, or submits of real estate listings. As an example, as a user browses one or more real estate listings, the user may click on a given real estate listing to view a property. As another example, when viewing or browsing a real estate listing, a user can save the real estate listing for future reference. As yet another example, the user submits a real estate listing. For instance, a submit can be submitting the real estate listing to a realtor for additional information about the real estate listing/property. Any such interactions of the user with a real estate property is stored in association with the user profile of the user in a real estate database.

Process 400 identifies a set of real estate listings that the user has interacted with based on the set of user interactions. For example, process 400 can obtain at least two interactions (e.g., clicks, saves, submits, or other interactions) with at least some of the real estate listings stored in the real estate database to identify a set of real estate listings a user has interacted with. As an example, while browsing real estate listings, the user may have saved one or more real estate listings to the user profile of the user to view the real estate listing(s) in the future. Process 400 identifies from the set of interactions (e.g., associated with the user profile of the user) a set of real estate properties the user has interacted with. For instance, if a user has clicked, saved, or submitted a real estate listing, such interaction data is stored in association with the user profile of the user. Process 400 can parse through the interaction data associated with the user and determine real estate listings of the real estate database the user has interacted with via a real estate listing identifier. For instance, as each real estate listing is associated with a real estate listing identifier (e.g., a real estate listing name, a URL, or other identifier), process 400 identifies via the interaction data stored in association with the set of real estate listings the user has interacted with.

In some implementations, each interaction of the user that corresponds to a real estate listing can be weighed. For example, since it is common for a user to browse multiple real estate listings, some interactions are weighted more heavily as compared to others. For instance, a user clicking on a given real estate listing is afforded a low weight due to the commonality of users clicking on various real estate listings while searching for real estate properties. On the contrary, a user saving a real estate listing (e.g., to view in the future) is afforded more weight. In some implementations, the weights can be predetermined for each interaction type. For example, the weights can be normalized on a scale 0-10, 0-100, 0-1000, or other scale where each interaction a user may have with a real estate listing corresponds to a value on the predetermined scale. For instance, where the predetermined scale is normalized on a scale of 0-10, a "click" on a real estate listing may correspond to a weight of 2, whereas a "save" of the real estate property may correspond to a weight of 8. Such interaction weights are stored in association with interaction data of a user's profile for later retrieval and/or processing. It should be noted, that although a scale of 0-10 has been explained, other scales or values can be afforded to various interactions of a user, in accordance with one or more implementations. In this way, as will later be explained, the system provides more accurate suggested real estate properties based on interaction data of a user.

At act 404, process 400 performs obtaining a set of home attributes associated with the set of real estate listings the user has interacted with. For example, based on the identified set of real estate listings the user has interacted with, process 400 can obtain a set of home attributes for each real estate listing the user has interacted with. For instance, to accurately provide a set of suggested real estate listings for a user, home attributes of real estate listings the user has interacted with may be obtained. For example, process 400 obtains, from the user profile associated with the user, the set of real estate listings the user has interacted with and extracts home attributes from each real estate listing of the set of real estate listings the user has interacted with. For instance, home attributes can be attributes that are associated with a home/real estate property such as a number of bedrooms, a number of bathrooms, price information, a collection identifier associated with the property, size of the property, lot size, number of stories, location information (e.g., an address, GPS coordinates, etc.), waterfront property, oceanfront property, landlocked property, house type (e.g., condo, single family dwelling, commercial dwelling, townhouse, etc.), square footage of the property/home, collection identifiers associated with the real estate listing, or other home features or attributes. In some implementations, process 400 can obtain at least two home attributes from the set of real estate listings the user has interacted with.

In some implementations, one or more machine learning models can be used to extract home attributes from each real estate listing a given user has interacted with. For example, database 215 may store one or more machine learning models configured to extract home attributes from real estate listings a user has interacted with. For instance, database 215 can store one or more Optical Character Recognition (OCR) models, Neural Networks (NN), Convolutional Neural Networks (CNN), Recurrent Neural Network (RNN), Support Vector Machines (SVM), Image-to-Text synthesis models, or other machine learning models configured to extract home attributes.

In one use case, where the machine learning model is a OCR model, process 400 obtains the OCR model from database 215. Where the user has interacted with a given real estate listing via a real estate listing website, server computing device 210 then provides webpage data (e.g., image data, HTML code, metadata, data associated with a URL of a real estate listing, etc.) associated with a real estate listing of the set of real estate listings that the user has interacted with to the OCR model to determine one or more home attributes of the real estate listing. For example, the OCR model can output a list, string, or other data structure that indicates home attributes.

In another use case, where the machine learning model is a neural network (NN), process 400 obtains the neural network from database 215. Server computing device 210 then obtains the set of real estate listings the user has interacted with and can provide the set of real estate listings the user has interacted with as input to the neural network to extract one or more home attributes from real estate listings a user has interacted with. For example, the real estate database can include one or more tags for each real estate listing the user has interacted with. The neural network can be configured to extract each tag from each real estate listing the user has interacted with, where each tag may represent a home attribute of a real estate listing the user has interacted with. In such case, the neural network outputs a set of tags (e.g., home attributes) from each real estate listing of the set of real estate listing the user has interacted with. In some implementations, such tags (or home attributes) can be stored in association with the user profile of the user to be used as a user's user preferences (e.g., preference towards one or more home attributes).

In act 406, process 400 generates a set of collection identifiers of interest to the user. For example, upon obtaining a set of home attributes associated with the set of real estate listings a user has interacted with, batch collection generation module 310 (FIG. 3) can generate a set of collection identifiers of interest to the user. Each collection identifier of the set of collection identifiers of interest to the user can be associated with a first set of suggested real estate listings. To clarify, based on real estate listings that a user has interacted with, the home attributes of such real estate listings are used to generate a set of collection identifiers where each collection identifier is associated with a set of suggested real estate listings.

For example, to reduce the amount of computer processing resources required to provide a user with suggested real estate listings, batch collection generation module 310 generates a set of collection identifiers of interest to the user based on interaction data associated with real estate listings a user has interacted with. As discussed above, the batch collection generation module 310 generates the set of collection identifiers of interest to the user over a time period such that when the time period elapses, the batch collection generation module 310 can update the set of collection identifiers of interest to the user to facilitate the most suitable set of collection identifiers of interest for a user. As an example, where the time period is 24 hours, the batch collection generation module 310 generates a new set of collection identifiers every 24 hours. It should be noted, that although 24 hours is given as an example of such time period, other time periods may be used.

A collection identifier can represent a collection name, a collection argument, or other collection identifier. A collection identifier can be defined in terms of a ranker and one or more filters. For example, a ranker and one or more filters represents a collection argument when considered collectively, and such collection argument are used to identify the collection. A ranker can rank real estate listings within a collection according to the collection title, and a filter can filter real estate listings such that the real estate listings are associated with the collection title. Each ranker can be associated with a particular sorting algorithm. For example, a "For you" ranker is based on a personalized relevance sort that ranks real estate listings based on a given user's preference towards a real estate listing (e.g., based on user interaction data, home attributes of real estate listings a user has interacted with, etc.). A "Popular" ranker is based on a global relevance sort that ranks real estate listings based on popularity of real estate listings according to all users of the system (e.g., via all available user profile information stored in database 215). For example, the popular ranker can sort real estate listings based on user interaction data for real estate listings across all users of the system. For instance, the popular ranker sorts real estate listings in descending order with the most interacted-with real estate listings being presented first while the least interacted real estate listing being presented last. A "Selling soon" ranker can be based on a sorting algorithm associated with the date of which real estate listings are being sold (e.g., sorts the sale date of real estate listings from earliest date of sale to latest date of sale). A "Recently listed" ranker can be based on a sorting algorithm that associated with the date of which real estate listings have been recently listed (e.g., sorts real estate listings based on their listing date from most recently listed to not most recently listed). Additionally, each collection identifier can be associated with a collection type, where the collection type determines specific ranker's and filters are used to generate a collection identifier (and any real estate listings that are associated with the collection identifier).

As an example, a collection type can be a "For You" collection, "Popular" collection, "Selling Soon" collection, "Open Houses For You" collection, or other collection type. For each collection type, one or more rankers or one or more filters can define a collection identifier. For example, for a "For You" collection type, to generate a "Homes for you in Seattle, Washington" collection identifier, a ranker of "For You" is used that is associated with a personalized relevance sorting algorithm, and a filter of "Seattle, WA" is be used. In such case, a set of suggested real estate listings that are associated with properties that are located in Seattle, Washington and properties that are tailored to the user (e.g., based on attributes of real estate listings the user has interacted with) are be associated with the collection identifier of "Homes for you in Seattle, Washington."

In some implementations, a set of collection identifiers of interest for a user can be generated. For example, process 500 of FIG. 6 may be triggered to generate a set of collection identifiers of interest for a user. Additionally, process 500 of FIG. 6 may also generate a first set of suggested real estate listings corresponding to each respective collection identifier of the set of collection identifiers of interest for a user. In some implementations, upon completion of process 500, act 408 is triggered.

At act 408, process 400 generates a second set of suggested real estate listings. For example, a second set of suggested real estate listings can be generated by a second prediction model using the set of home attributes associated with the set of real estate listings the user has interacted with. For instance, the second set of suggested real estate listings may be a set of real estate listings that are not generated in a batch process (e.g., via batch collection generation module 310) to provide the user with the most up-to-date real estate listing suggestions.

For example, the second prediction model is any prediction model configured to generate a set of suggested real estate listings. For instance, the second prediction model can be a Neural Network (NN), Convolutional Neural Network (CNN), Recurrent Neural Network (RNN), Support Vector Machine (SVM), or other prediction model configured to generate a set of suggested real estate listings. In some implementations, the second prediction model is trained on real estate listing interaction data. For example, in some implementations, client device 302 sends a first request to graph data provider 304 to obtain a set of suggested real estate listings. The first request may include arguments such as collection identifiers, a ranker, a filter, number of real estate recommendations, account identifier, real estate listing tags, or other arguments. As an example, the collection identifiers, ranker, and filters are the same or similar to the collection identifiers, rankers, and filters of the set of ranked personalized collection identifiers generated in act 508 of process 500. Upon the graph data provider 304 obtaining the requests from client device 302, graph data provider 304 transmits a second request to recommendation module 306 to obtain a second set of suggested real estate listings that correspond to a collection identifier. For example, the first request can specify multiple collection identifiers. Graph data provider 304 can send second requests for each collection identifier of the multiple collection identifiers in the first request to obtain the second set of suggested real estate listings for each collection identifier specified in the first request.

Upon recommendation module 306 receiving each second request, recommendation module 306 obtains a user profile corresponding to a user and generates a set of suggested real estate listings for each collection identifier specified in each second request. For example, recommendation module 306 can obtain from user profile module 312, a user profile corresponding to a user identifier of each second request via UPS module 308. Upon obtaining the user profile from user profile module 312, recommendation module 306 determines a set of home attributes associated with real estate listings the user has interacted with.

In some implementations, as recommendation module 306 obtains the user profile corresponding to a user, recommendation module 306 obtains interaction information to provide to the second prediction model. For instance, the user profile can include information that indicates previous interactions with real estate listings (e.g., interaction information). As previously explained, a user may have previously clicked on one or more real estate listings, saved one or more real estate listings, or submitted one or more real estate listings. To obtain the most up-to-date suggested real estate listings, recommendation module 306 filters the interaction information by a cut off date/time. For example, each user interaction with the real estate listings can be associated with a timestamp at which the user interacted with a given real estate listing. Recommendation module 306 then compares a predetermined cut off time to the time/date at which the user interacted with a given real estate listing and selects user interaction information that is within the cut off time/date. For example, where the predetermined cutoff time/date is 30 days, recommendation module 306 selects a subset of the set of user interaction data in which a user has interacted with a real estate listing in the last 30 days. In this way, any suggested real estate listings generated reflects the user's current interests as opposed to older interests.

Upon recommendation module 306 obtaining the user interaction information, recommendation module 306 provides the user interaction information and first request information to the second prediction model to generate a second set of suggested real estate listings of interest to the user. To ensure that the second set of suggested real estate listings are of interest to the user, not only is the most current user interaction data used (e.g., as explained above), but also the type of user interaction may have an effect on the set of suggested real estate listings. For example, as each prior user interaction with real estate listings may be of a different type (e.g., a click, save, submit, or other interaction), such interactions can be associated with a differing weight. For instance, a click may have a lower weight than a save or a submit. Thus, the weight of each type of user interaction are provided to the first prediction model to generate the most suitable set of real estate recommendations.

At act 410, process 400 select a set of suggested real estate listings satisfying a threshold value. For example, the threshold value can be a predetermined number of suggested real estate listings for a given collection identifier, a predetermined number of suggested real estate listings for each collection identifier collectively (e.g., in total), a predetermined time value (e.g., to generate the second set of suggested real estate listings), or other threshold value. A set of suggested real estate listings can be selected (e.g., the first set of suggested real estate listings generated in act 506 of process 500 or the second set of suggested real estate listings generated in act 408 of process 400) in response to the set of suggested real estate listings satisfying a threshold value.

For instance, where the threshold value is a predetermined number of suggested real estate listings for a given collection, process 400 can determine whether the second set of suggested real estate listings satisfy the predetermined number of real estate listings for a given collection identifier. For example, where the predetermined number of suggested real estate listings for the given collection is 4, process 400 determines whether the second set of suggested real estate listings for the given collection meets or exceeds the threshold value. In response to the second set of suggested real estate listings for the given collection identifier meeting or exceeding the threshold value, process 400 determines the second set of suggested real estate listings for the given collection identifier satisfied the threshold value. On the contrary, where the second set of suggested real estate listings for the given collection identifier fails to meet or exceed the threshold value, process 400 determines the second set of suggested real estate listings for the given collection identifier fails to satisfy the threshold value.

As another example, where the threshold value is a predetermined time value, process 400 can determine whether the second set of suggested real estate listings satisfy the predetermined time value. For instance, to reduce delays when providing sets of suggested real estate listings to users (or sets of real estate collection identifiers to a user), process 400 selects a suggested set of real estate listings that is generated within a predetermined time value. For example, the predetermined time value may be 1 second, 2 seconds, 3 seconds, 1 minute, 2, minutes, or other predetermined time value. Process 400 may determine that the generation of the second set of suggested real estate listings satisfy the predetermined time value. For example, although the second set of suggested real estate listings may include more up-to-date suggested real estate listings for a user (e.g., due to being generated upon request as opposed to in a batch), users often want results as quickly as possible to help them identify homes of interest. Thus, if the generation of the second set of suggested real estate listings meet or exceeds the predetermined time value (e.g., 3 seconds or more), process 400 selects the first set of suggested real estate listings in lieu of the second set of suggested real estate listings. In this way, delays associated with providing users recommended real estate suggestions are reduced as the first set of suggested real estate listings, as explained above, are batch generated and are therefore pre-generated, allowing the system to retrieve such real estate suggestions more quickly than the second set of suggested real estate listings.

In some implementations, process 400 selects the second set of suggested real estate listings. For example, recommendation module 310 selects the second set of suggested real estate listings in lieu of the first set of suggested real estate listings based on the generation of the second set of suggested real estate listings failing to satisfy the threshold value. As an example, where the threshold value is a predetermined time value, recommendation module 310 selects the second set of suggested real estate listings when the generation of the second set of suggested real estate listings fail to satisfy the predetermined time value (e.g., are generated within the allotted time). In this way, not only are delays associated with providing suggested real estate listings to users reduced, but the user also have the most up-to-date suggested real estate listings based on their user preferences—thereby improving the user experience.

In some implementations, process 400 generates for display, each of the ordered (or otherwise ranked) personalized collection identifiers. For example, where a user is using a client device to view the set of personalized collection identifiers and the set of suggested real estate listings that correspond to the set of personalized collection identifiers, process 400 can generate for display in a user interface of the client device, the set of personalized collection identifiers, where each personalized collection identifier of the set of personalized collection identifiers includes the set of suggested real estate listings that correspond to a respective personalized collection identifier. In this way, by displaying the ordered (or otherwise ranked) personalized collection identifiers, users may quickly see and identify suggested real estate listings (corresponding to personalized collection identifiers)—thereby improving the user experience.

Generate Set of Personalized Collection Identifiers

Figure 5:
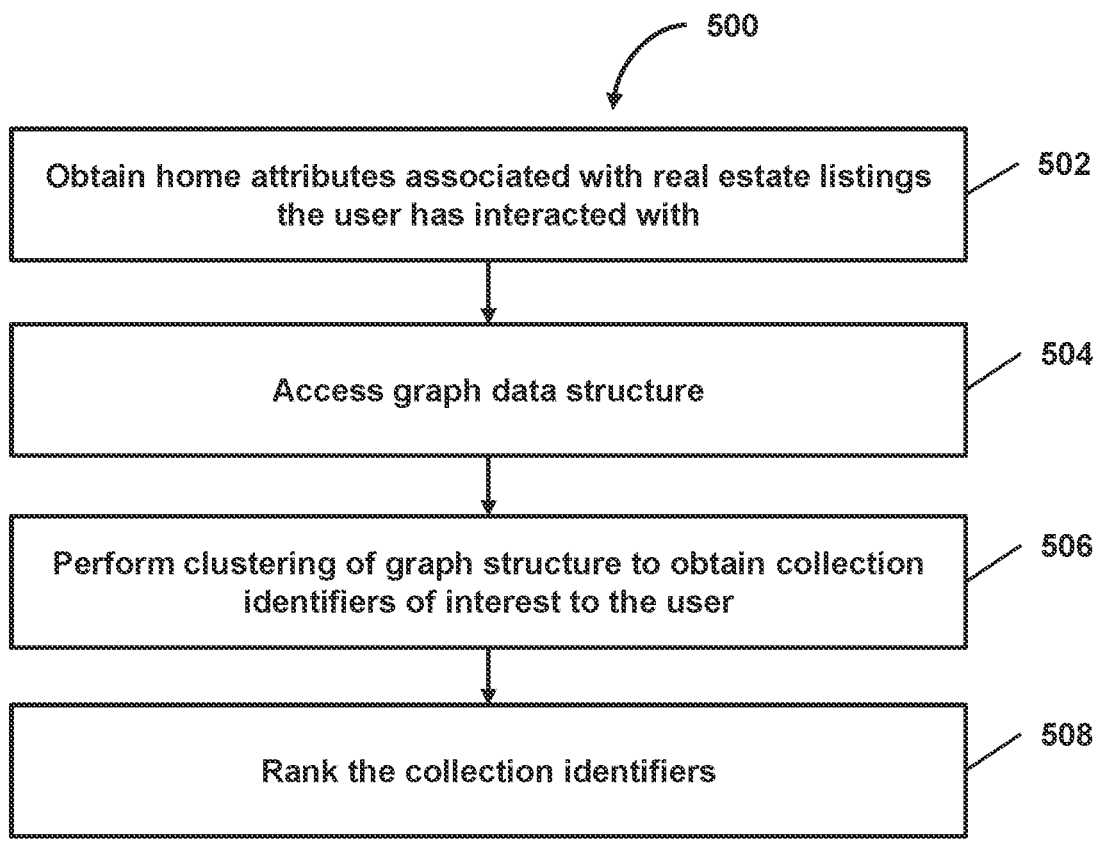
FIG. 5 is a flow diagram illustrating a process generating personalized collection identifiers in accordance with some implementations of the present technology.

FIG. 5 is a flow diagram illustrating a process 500 of generating a set of collection identifiers that are of interest to a user in accordance with some implementations of the present technology.

At act 502, process 500 obtains a set of home attributes associated with a set of real estate listings a user has interacted with. For example, as discussed in act 404 of process 400 (FIG. 4), the set of home attributes associated with a set of real estate listings a user has interacted with can represent home attributes a user is interested in. Process 500 can use the set of home attributes associated with a set of real estate listings a user has interacted with to generate a set of collection identifiers of interest to a user.

Figure 6:
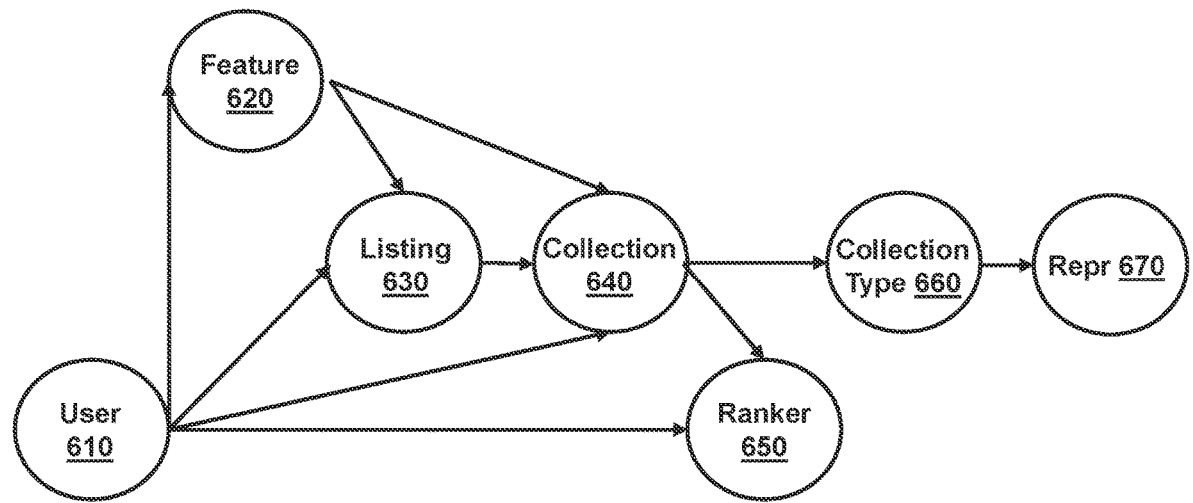
FIG. 6 is a block diagram of a graph data structure in accordance with some implementations of the present technology.

At act 504, process 500 determines a set of collection identifiers of interest to a user. For example, to determine a set of collection identifiers of interest to a user, batch collection generation module 310 accesses a graph data structure containing one or more nodes and one or more edges. Referring to FIG. 6, for example, the graph data structure can be a k-partite graph structure with one or more layers. The one or more nodes represent user node 610, feature node 620, listing node 630, collection node 640, ranker node 650, collection type node 660, and representation node 670. The one or more edges represent user-feature edge (e.g., edge connecting user node 610 to feature node 620), user-listing edge (e.g., edge connecting user node 610 to listing node 630), user-collection edge (e.g., edge connecting user node 610 to collection node 640), user-ranker edge (e.g., edge connecting user node 610 to ranker node 650), feature-listing edge (e.g., connecting feature node 620 to listing node 630), feature-collection edge (e.g., connecting feature node 620 to collection node 640), listing-collection edge (e.g., connecting listing node 630 to collection node 640), collection-ranker edge (e.g., connecting collection node 640 to ranker node 650), collection-collection type edge (e.g., connecting collection node 640 to collection type node 660), and collection type-representation edge (e.g., connecting collection type node 660 to representation node 670).

As an example, user node 610 can include user specific information that is associated with a user profile of a user. For example, the user profile of a user includes user account information, real estate listing interaction data, or other user profile information. Feature node 620 can include one or more home features (e.g., home attributes) that a user has interacted with. For example, feature node 620 includes the set of home attributes associated with the set of real estate listings a user has interacted with as obtained in act 404 of process 400. Listing node 630 can include real estate listings. For example, listing node 630 includes all available real estate listings stored in a real estate data base (e.g., database 215). Collection node 640 can include all collection identifiers currently implemented. Ranker node 650 can include all current ranker's used to generate one or more collection identifiers. For example, ranker node 650 includes rankers such as "For You," "Popular," "Selling Soon," "Recently Listed," or other rankers. Additionally, ranker node 650 can also include associated sorting algorithms with respect to each ranker (e.g., personalized relevance sort, global relevance sort, selling soon sort, recently listed sort, etc.) Collection Type node 660 can include the definitions of every particular collection identifier implemented in the system. For example, collection type node 660 includes every ranker/filter combination used to generate a particular collection identifier. Representation node 670 can include different representations of each collection identifier. For example, as every collection identifier may be expressed in various ways (e.g., different titles, different names, etc.), representation node 670 includes one or more templates for representing a particular collection identifier once generated.

In some implementations, each node of graph data structure is be encoded. For instance, to reduce the amount of computer memory required to store such a large graph structure, the information represented and/or included in the graph data structure can be encoded into an integer format. For example, each node of the graph data structure can be associated with a prefix integer value (e.g., 1, digit, 2 digits, 3 digits, or more digits etc.). Additionally, the information included in each node of the graph data structure can be associated with a suffix integer value (e.g., 1, digit, 2 digits, 3, digits, or more digits). For instance, for user node 610 may correspond to a prefix integer value of "10" and a user profile identifier of a user may be associated with suffix integer value of "1234." For example, a user can be represented by the value "101234" where the "10" represents data collected from user node 610 and "1234" represents the corresponding user from the user profile information included in user node 610. In some implementations, each prefix and suffix integer value are stored in a dictionary data structure that maps each prefix and suffix integer value to their corresponding nodes and information included in each node. In this way, by storing such information in an integer format, the system generates a graph with a smaller size which also reduces the amount of computer processing resources utilized when generating collection identifiers of interest to a user.

At act 506, process 500 performs clustering on the graph data structure to obtain collection identifiers of interest to the user. For example, process 500 can perform one or more clustering algorithms on the graph data structure to obtain a set of collection identifiers that are of interest to the user. For instance, the one or more clustering algorithms can be edge betweenness clustering, biconnected components clustering, location based clustering, k-means clustering, hierarchic clustering, or other clustering algorithms. Such clustering may involve all data associated with each node of the graph data structure. Based on the clustering of the graph structure, process 500 obtains a set of collection identifiers of interest to the user.

Additionally, each collection identifier of the set of collection identifiers of interest to the users can be associated with a first set of suggested real estate listings. For example, a first collection identifier may be associated with one set of suggested real estate listings that correspond to the collection identifier (e.g., the ranker and filter's associated with the collection identifier) and a second collection identifier may be associated with another set of suggested real estate listings that correspond to the second collection identifier. During the clustering process described in act 506 above, as each collection identifier of interest is generated, so can a set of suggested real estate listings that correspond to the collection respective collection identifier.

For example, the clustering process can use user interaction data (e.g., real estate listings the user has interacted with, the type of interaction with respect to a real estate listing the user has interacted with, home attributes of real estate listings the user has interacted with, or other interaction data consistent with one or more implementations) to determine one or more sets of suggested real estate listings that correspond to one or more collection identifiers of interest to the user. A set of suggested real estate listings can correspond to a collection identifier of interest to the user where each real estate listing of the set of suggested real estate listings have at least one home attribute that the collection identifier requires. For instance, where a collection identifier of "Homes for you in Seattle, WA," each real estate listing in the first set of suggested real estate listings that correspond to the collection identifier of "Homes for you in Seattle, WA" is associated with location information of Seattle, WA.

In some implementations, the first set of suggested real estate listings (e.g., that correspond to a given collection identifier) are generated based on a their relevance to the user. For example, process 500 can provide one or more machine learning models user profile information, such as interaction data of a user, and real estate listings attributes corresponding to real estate listings stored in a real estate database, real estate listing attributes a user has interacted with (e.g., at least 1 attribute, at least 2 attributes, etc.) to generate a set of relevance scores corresponding to each real estate listing stored in the real estate database. For example, the one or more machine learning models can be a Neural Network, Convolutional Neural Network, Recurrent Neural Network, Gradient Boosting Tree model, Support Vector Machine, or other machine learning model. Such machine learning models can be trained on user profile information and real estate listing attributes corresponding to real estate listings stored in the real estate database. As such, the machine learning model outputs a set of relevance scores corresponding to real estate listings stored in the real estate database to provide a first set of suggested real estate listings. In some implementations, the real estate listings (e.g., stored in the real estate database) can be ordered based on their respective relevance score in descending order with the first real estate listing of the having the highest relevance score and the last real estate listing having the lowest relevance score. As an example, where the relevance scores are normalized on a scale 0-100, 100 may represent the highest relevance score and 0 may represent the lowest relevance score with respect to a user. In some implementations, of the scored real estate listings, to provide the user with a set of suggested real estate listings, process 500 selects a predetermined number of real estate listings having the highest relevance scores to provide the user with the first set of suggested real estate listings. For example, where the predetermined number is 4 real estate listings, process 500 parses through each of the scored real estate listings to select the 4 highest scored real estate listings as the first set of suggested real estate listings.

In act 508, based on the obtained set of collection identifiers of interest to the user, each collection identifier of the set of collection identifiers are ranked to provide the most suitable collection identifiers to the user. For example, process 500 can use one or more machine learning models to rank each of the collection identifiers of the set of collection identifiers of interest to the user. For instance, the one or more machine learning models can be a linear machine learning model (e.g., a Neural Network).

For example, the linear model can be a linear machine learning model that uses listing relevance scores, probabilities of a user being interested in one or more collection identifier features, or a click through rate of one or more collection identifiers to rank each of the collection identifiers of the set of collection identifiers of interest to the user. For example, the linear model may be configured to take the listing relevance scores (e.g., relevance scores of real estate listings of interest to a user), probabilities of a user being interested in one or more collection identifier features (e.g., collection identifier region, collection identifier ranker, collection identifier tag, etc.), or the click through rate of one or more collection identifier regions, rankers, tags, as input to generate, as outputs, a set personalized, ranked, collection identifiers of interest to a user.

For example, the listing relevance scores can be the listing relevance scores obtained in act 506 of process 500. The probabilities of a user being interested in one or more collection identifier features can be one or more sets of probabilities corresponding to probabilities that a collection identifier region, collection identifier ranker, or collection identifier tag is of interest to the user, respectively. For instance, the probabilities of a user being interest in one or more collection identifier features can be generated based on one or more histograms of a user profile. For example, as a user interacts with one or more real estate listings of the real estate database, such interactions are stored in association with the user's profile. If a user interacts with a real estate listing that is associated with a collection identifier region, ranker, or tag, such interaction data is used to update a histogram corresponding to a collection identifier, region, ranker, or tag respectively. Additionally, in some implementations, where the type of interaction is associated with a weight, such weight can be accounted for to influence the respective histogram. For example, where a user saved a real estate listing (e.g., as opposed to merely clicking on the given real estate listing), where the given real estate listing is associated with a collection identifier region of Seattle, WA, the system affords more weight to Seattle, WA in the histogram. Therefore, such histogram indicates a user's preference towards Seattle, WA more heavily based on the type of the user interaction being a "save" as opposed to a mere "click," in accordance with one or more implementations. Additionally, the click through rate of collection identifiers (e.g., collection identifier regions, ranker, tags, etc.) of all users of the system can be fed as input to the linear model. For example, each time any user interacts with one or more collection identifiers associated with a given region, ranker, or tag, such interactions are counted and used as input to the linear model. For example, where 5 users of the system clicked on a collection identifier associated with a region of NYC, NY, a counter variable associated with the region of NYC, NY is 5. Similarly, where 8 users of the system clicked on a collection identifier associated with a ranker of "Selling Soon," a counter variable associated with the ranker of "Selling Soon" is 8. Such click through rate information of collection identifier regions, rankers, and tags, are stored in the real estate database (e.g., database 215).

The linear model takes such listing relevance scores, probabilities of a user being interested in one or more collection identifier features, or the click through rate of one or more collection identifier regions, rankers, or tags, as input to generate a set of ranked personalized collection identifiers. For example, the linear model can use one or more optimization algorithms (e.g., gradient descent or other machine learning optimization algorithm) which can generate a set of ranked personalized collection identifiers as output. The ranked set of personalized collection identifiers can be ranked in an order corresponding to a probability that a user is interested in the personalized collection identifiers in descending order, with the first personalized collection identifier indicating a personalized collection identifier of most interest to the user and the last personalized collection identifier indicating a personalized collection identifier of least interest to the user. For example, the output may represent probabilities that a user is interested in respective collection identifiers. In some implementations, the probabilities can be normalized on a scale 0.0-0.99 where 0.0 indicates a user is least interested in a given collection identifier and 0.99 indicates a user is most interested in a given collection identifier. As such, process 500 may rank the collection identifiers corresponding to a respective collection identifier's probability in descending order.

In some implementations, process 500 selects a predetermined amount of collection identifiers of the set of collection identifiers satisfying a threshold probability value. For example, the predetermined amount of collection identifiers can be a 1, 2, 3, 4, or so on amount of collection identifiers. Additionally, the threshold probability value can be a predetermined value such as 0.80, 0.81, 0.90, 0.91 or other predetermined threshold value. In a use case, where the predetermined amount of collection identifiers of the set of collection identifiers is 3 and the threshold probability value is 0.90, process 500 selects 3 collection identifiers that satisfy (e.g., meet or exceed) the probability threshold value of 0.90. For example, where a given collection identifier represents "Homes for you in Seattle, WA" with a 0.98 probability of interest to the user, process 500 selects the collection identifier of "Homes for you in Seattle, WA" as a first personalized collection identifier for the user. In some implementations, process 500 can select the predetermined amount of collection identifiers of the set of collection identifiers that have the highest threshold probability value. For example, where the set of collection identifiers are ranked in descending order, and the predetermined amount of collection identifiers is 4 collection identifiers, process 500 selects the first 4 collection identifiers ranked in descending order as a set of personalized collection identifiers of interest to the user.

In some implementations, where a user profile includes timestamp information of one or more interactions with real-estate listings, the timestamp information is used to generate a set of collection identifiers for a given user. For example, an issue common in suggesting real estate listings for a user is determining whether a user is searching for a particular style of home (or searching for a home with a particular set of attributes) currently. For instance, in one month, a user may search for a home in New York City, NY while in another month, a user may be searching for a home in Seattle, WA. To suggest the most suitable real estate listing suggestions for a user, there is a need to know what the user is currently searching for. To overcome this, timestamp information associated with a user's interactions with one or more real estate listings may be used to determine what the user is currently searching for. For example, a predetermined cut-off date/time can be used to determine the real estate listings a user is currently searching for which is used to provide a set of suggested real estate listings for the user. The predetermined cut-off date/time can be 30 days, 40 days, 50 days, 60 days, 1 year, or other predetermined cut-off date/time. When the batch collection generation module 310 obtains user interaction information (e.g., a user's interactions with one or more real estate listings), batch collection generation module 310 obtains a subset of the user's interaction information such that the subset includes interaction information that is within the predetermined cut-off date/time. In this way, the system generates personalized collection identifiers (which are each associated with a suggested set of real estate listings) based on real estate listings the user is currently searching for, thereby providing more accurate suggested real estate listings for the user.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for providing a set of ordered personalized real estate listings according to real estate collection identifiers that are customized to one or more of a user's real estate interests comprising:
   at least one processor;
   a remote data store storing:
      user profiles associated with a plurality of users;
      real estate listings; and
   at least one memory coupled to the at least one processor and storing instructions that, when executed by the at least one processor, perform operations comprising:
      executing a batch generation process, wherein the batch generation process is performed periodically, the batch generation process including:
         accessing the remote data store to obtain, from a user profile associated with a user, at least two of (i) clicks, (ii) saves, or (iii) submits associated with at least some of the real estate listings;
         identifying, based on the at least two of (i) clicks, (ii) saves, or (iii) submits associated with the at least some of the real estate listings, a set of real estate listings the user has interacted with;
         obtaining, based on the identified set of real estate listings the user has interacted with, a set of home attributes associated with the set of real estate listings the user has interacted with, the set of home attributes comprising at least two of (i) locations, (ii) features, (iii) prices, or (iv) collection identifiers;
         generating a set of personalized collection identifiers of interest to the user, by a temporal batch generation service, using the at least two of (i) locations, (ii) features, (iii) prices, or (iv) collection identifiers associated with each real estate listing of the set of real estate listings the user has interacted with, wherein a personalized collection identifier of the set of personalized collection identifiers identifies a first set of suggested real estate listings, wherein the first set of suggested real estate listings is periodically generated;

generating, by a first prediction model, a set of predictions corresponding to the set of personalized collection identifiers of interest to the user using the at least two of (i) location information, (ii) features, (iii) price information, or (iv) collection identifiers associated with each suggested real estate listing of the first set of suggested real estate listings, wherein the set of predictions indicate probabilities that the user may interact with a visual representation of a respective personalized collection identifier; and ordering each of the personalized collection identifiers of the set of personalized collection identifiers of interest to the user based on a respective probability in descending order;

receiving, from a user device, a request for one or more real estate listings; and in response to the request, generating, within a user interface of the user device, a graphical display including one or more real estate listings, wherein generating the graphical display includes:

initiating generation of a second set of suggested real estate listings by a second prediction model using the at least two of (i) the locations, (ii) the features, (iii) the prices, or (iv) the collection identifiers associated with each real estate listing of the set of real estate listings that the user has interacted with;

monitoring a time spent generating the second set of suggested real estate listings;

in response to the time spent generating the second set of suggested real estate listings exceeding a threshold time value, identifying the first set of suggested real estate listings in real time based on the set of personalized collection identifiers; and generating the graphical display, the graphical display including the first set of suggested real estate listings in lieu of the second set of suggested real estate listings.

2. The system of claim 1, wherein generating the graphical display further includes:

in response to the time spent generating the second set of suggested real estate listings failing to exceed the threshold time value, generating the graphical display in response to the request, the graphical display including the second set of suggested real estate listings in lieu of the first set of suggested real estate listings within the user interface of the user device.

3. The system of claim 1, wherein the instructions when executed by the at least one processor further perform operations comprising:

generating, for display, on the user interface, each of the ordered personalized collection identifiers.

4. The system of claim 1, wherein the instructions when executed by the at least one processor further perform operations comprising:

generating, by a third prediction model, a set of relevance scores corresponding to respective real estate listings of the first set of real estate listings for a respective personalized collection identifier, using at least two of (i) the location information, (ii) the features, (iii) the prices, or (iv) the collection identifiers associated with each real estate listing of the first set of suggested real estate listings;

ordering the first set of suggested real estate listings in descending order based on the set of relevance scores corresponding to the first set of suggested real estate listings.

5. A method for providing a set of ordered personalized real estate listings according to real estate collection identifiers that are customized to one or more of a user's real estate interests comprising:

executing a batch generation process, wherein the batch generation process is performed periodically, the batch generation process including:

accessing a remote data store to obtain, from a user profile corresponding to a user, a set of user interactions with real estate listings to identify a set of real estate listings that the user has interacted with;

obtaining, based on the identified set of real estate listings the user has interacted with, a set of home attributes associated with the set of real estate listings the user has interacted with;

generating a set of personalized collection identifiers of interest to the user, by a temporal batch generation service, using the set of home attributes associated with the set of real estate listings the user has interacted with, wherein a personalized collection identifier of the set of personalized collection identifiers identifies a first set of suggested real estate listings, wherein the first set of suggested real estate listings is periodically generated;

generating, by a first prediction model, a set of predictions corresponding to the set of personalized collection identifiers of interest to the user, using a second set of home attributes associated with the first set of suggested real estate listings, wherein the set of predictions indicate probabilities that the user may interact with a visual representation of a respective personalized collection identifier; and ordering each of the personalized collection identifiers of the set of personalized collection identifiers based on a respective probability in descending order;

receiving, from a user device, a request for one or more real estate listings; and in response to the request, generating, within a user interface of the user device, a graphical display including one or more real estate listings, wherein generating the graphical display includes:

initiating generation of a second set of suggested real estate listings by a second prediction model using the set of home attributes associated with the set of real estate listings the user has interacted with;

monitoring a time spent generating the second set of suggested real estate listings;

in response to the time spent generating the second set of suggested real estate listings exceeding a threshold time value, identifying the first set of suggested real estate listings in real time based on the set of personalized collection identifiers; and generating the graphical display, the graphical display including the first set of suggested real estate listings in lieu of the second set of suggested real estate listings.

6. The method of claim 5, wherein generating the graphical display further includes:

in response to the time spent generating the second set of suggested real estate listings failing to satisfy the threshold time value, generating the graphical display in response to the request, the graphical display including the second set of suggested real estate listings in lieu of the first set of suggested real estate listings within the user interface of the user device.

7. The method of claim 5, further comprising:
generating, for display on the user interface of the user device, each of the ordered personalized collection identifiers.

8. The method of claim 5, further comprising:
generating, by a third prediction model, a set of relevance scores corresponding to respective real estate listings of the first set of real estate listings for a respective personalized collection identifier, using the second set of home attributes associated with each real estate listing of the first set of suggested real estate listings; and
ordering the first set of suggested real estate listings in descending order based on the set of relevance scores corresponding to the first set of suggested real estate listings.

9. The method of claim 5, wherein the set of interactions with the real estate listings comprises at least one of (i) clicks, (ii) saves, or (iii) submits corresponding to the real estate listings.

10. The method of claim 5, wherein the set of home attributes and the second set of home attributes respectively comprise at least one of (i) location information, (ii) features, (iii) price information, or (iv) collection identifiers.

11. The method of claim 5, further comprising:
detecting, based on the temporal batch generation service, that a first period of time has elapsed; and
updating the set of collection identifiers of interest to the user in response to the detection that the first period of time has elapsed.

12. One or more non-transitory computer-readable media comprising instructions that, when executed by one or more processors, cause operations comprising:
executing a batch generation process, wherein the batch generation process is performed periodically, the batch generation process including:
accessing a remote data store to obtain, from a user profile corresponding to a user, a set of user interactions with real estate listings to identify a set of real estate listings that the user has interacted with;
obtaining, based on the identified set of real estate listings the user has interacted with, a set of home attributes associated with the set of real estate listings the user has interacted with;
generating a set of personalized collection identifiers of interest to the user, by a temporal batch generation service, using the set of home attributes associated with the set of real estate listings the user has interacted with, wherein a personalized collection identifier of the set of personalized collection identifiers identifies a first set of suggested real estate listings, wherein the first set of suggested real estate listings is periodically generated;
generating, by a first prediction model, a set of predictions corresponding to the set of personalized collection identifiers of interest to the user, using a second set of home attributes associated with the first set of suggested real estate listings, wherein the set of predictions indicate probabilities that the user may interact with a visual representation of a respective personalized collection identifier; and
ordering each of the personalized collection identifiers of the set of personalized collection identifiers based on a respective probability in descending order;
receiving, from a user device, a request for one or more real estate listings; and
in response to the request, generating, within a user interface of the user device, a graphical display including one or more real estate listings, wherein generating the graphical display includes:
initiating generation of a second set of suggested real estate listings by a second prediction model using the set of home attributes associated with the set of real estate listings the user has interacted with;
monitoring a time spent generating the second set of suggested real estate listings;
in response to the time spent generating the second set of suggested real estate listings exceeding a threshold time value, identifying the first set of suggested real estate listings in real time based on the set of personalized collection identifiers; and
generating the graphical display, the graphical display including the first set of suggested real estate listings in lieu of the second set of suggested real estate listings.

13. The media of claim 12, wherein generating the graphical display further includes:
in response to the time spent generating the second set of suggested real estate listings failing to satisfy the threshold time value, generating the graphical display in response to the request, the graphical display including the second set of suggested real estate listings in lieu of the first set of suggested real estate listings within the user interface of the user device.

14. The media of claim 12, the operations further comprising:
generating, for display on the user interface of the user device, each of the ordered personalized collection identifiers.

15. The media of claim 12, the operations further comprising:
generating, by a third prediction model, a set of relevance scores corresponding to respective real estate listings of the first set of real estate listings for a respective personalized collection identifier, using the second set of home attributes associated with each real estate listing of the first set of suggested real estate listings; and
ordering the first set of suggested real estate listings in descending order based on the set of relevance scores corresponding to the first set of suggested real estate listings.

16. The media of claim 12, wherein the set of interactions with the real estate listings comprises at least one of (i) clicks, (ii) saves, or (iii) submits corresponding to the real estate listings.

17. The media of claim 12, wherein the set of home attributes and the second set of home attributes respectively comprise at least one of (i) location information, (ii) features, (iii) price information, or (iv) collection identifiers.

18. The media of claim 12, the operations further comprising:
detecting, based on the temporal batch generation service, that a first period of time has elapsed; and updating the set of collection identifiers of interest to the user in response to the detection that the first period of time has elapsed.

\* \* \* \* \*